(12) United States Patent
Paez

(10) Patent No.: US 8,914,981 B1
(45) Date of Patent: Dec. 23, 2014

(54) WEED CUTTER WITH VACUUM

(71) Applicant: Bruce A. Paez, Monrovia, CA (US)

(72) Inventor: Bruce A. Paez, Monrovia, CA (US)

(*) Notice: Subject to any disclaimer, the term of this patent is extended or adjusted under 35 U.S.C. 154(b) by 180 days.

(21) Appl. No.: 13/747,618

(22) Filed: Jan. 23, 2013

(51) Int. Cl.
*A01D 43/063* (2006.01)
*A01D 34/82* (2006.01)

(52) U.S. Cl.
CPC ................................. *A01D 34/82* (2013.01)
USPC ............................................ 30/124; 30/276

(58) Field of Classification Search
USPC ............................... 56/12.8, 12.9, 13.1
See application file for complete search history.

(56) References Cited

U.S. PATENT DOCUMENTS

| | | | | |
|---|---|---|---|---|
| 2,263,431 A * | 11/1941 | White | ............ | 56/13.4 |
| 3,103,069 A * | 9/1963 | Gary | ............ | 30/124 |
| 3,481,036 A * | 12/1969 | Slaughter | ............ | 30/124 |
| 4,219,931 A * | 9/1980 | Vacilotto | ............ | 30/133 |
| 4,281,457 A * | 8/1981 | Walton, II | ............ | 30/124 |
| 4,314,435 A * | 2/1982 | Schmidt | ............ | 56/13.3 |
| 4,964,472 A * | 10/1990 | Cleworth | ............ | 171/11 |
| 5,535,479 A | 7/1996 | Pink et al. | | |
| 5,588,289 A * | 12/1996 | Wilson | ............ | 56/13.1 |
| 5,727,283 A | 3/1998 | Webster | | |
| 5,862,595 A | 1/1999 | Keane | | |
| 6,105,253 A * | 8/2000 | Kolbert | ............ | 30/124 |
| 6,280,532 B1 * | 8/2001 | Allen | ............ | 134/21 |
| 6,751,871 B2 * | 6/2004 | Furnish | ............ | 30/276 |
| 6,886,258 B2 * | 5/2005 | Swanson | ............ | 30/276 |
| 2003/0051348 A1 * | 3/2003 | Furnish | ............ | 30/124 |
| 2008/0110026 A1 | 5/2008 | Marcoe | | |
| 2008/0127621 A1 * | 6/2008 | Bovo et al. | ............ | 56/12.9 |
| 2014/0109412 A1 * | 4/2014 | Grande | ............ | 30/124 |

* cited by examiner

Primary Examiner — Hwei C Payer
(74) Attorney, Agent, or Firm — Crossley Patent Law

(57) ABSTRACT

A weed cutter with vacuum that includes a removable cover, a cylindrical chamber attachable to the cover, an intake column fastened endwise to the chamber opposite the cover, with a vacuum impeller disposed within the chamber, a motor disposed distally within the intake column, which motor engages a cutting blade pivotally mounted at a distal end of the intake column, wherein debris created at the cutting blade is drawn into the cylindrical chamber and captured in a filter column disposed therein.

6 Claims, 4 Drawing Sheets

WEED CUTTER WITH VACUUM

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of weed cutter with vacuums are known in the prior art. However, what is needed is a weed cutter with vacuum that includes a removable cover, a cylindrical chamber attachable to said cover, an intake column fastened endwise to the chamber opposite the cover, with a vacuum impeller disposed within the chamber, a motor disposed distally within the intake column, which motor engages a cutting blade pivotally mounted at a distal end of the intake column, wherein debris created at the cutting blade is drawn into the cylindrical chamber and captured in a filter column disposed therein.

FIELD OF THE INVENTION

The present invention relates to a weed cutter with vacuum, and more particularly, to a weed cutter with vacuum that includes a removable cover, a cylindrical chamber attachable to said cover, an intake column fastened endwise to the chamber opposite the cover, with a vacuum impeller disposed within the chamber, a motor disposed distally within the intake column, which motor engages a cutting blade pivotally mounted at a distal end of the intake column, wherein debris created at the cutting blade is drawn into the cylindrical chamber and captured in a filter column disposed therein.

SUMMARY OF THE INVENTION

The general purpose of the weed cutter with vacuum, described subsequently in to greater detail, is to provide a weed cutter with vacuum which has many novel features that result in a weed cutter with vacuum which is not anticipated, rendered obvious, suggested, or even implied by prior art, either alone or in combination thereof.

When weeding in the yard or garden one often inadvertently releases innumerable seeds pulling or cutting the weeds. Weed cutting devices especially can act as a ready seed dispersal agent, even when used to control weeds. Thus, the means of controlling and reducing weed populations can inadvertently become the means for their dispersal and renewal.

The present device has been devised to encase seeds and debris created while cutting weeds. The present device, a weed cutter with vacuum, includes a means for cutting weeds, grasses, and similar vegetation, with a means for creating a vacuum within a cylindrical chamber wherein consequent debris may be collected and stored, and thusly contained prior to disposal.

The means for cutting is provided by a blade, mounted on a central pivot on a distal end of the instant weed cutter with vacuum. This blade is engaged by a motor, which motor is mounted on a concave side of a frustroconical cup mounted within an intake column disposed distally upon the device. This blade is operationally controlled by means of a switch, the switch disposed on a raised handle proximally upon the device.

A cylindrical chamber is attached to and above the intake column, the chamber generally disposed centrally within the device. A vacuum impeller is disposed within the cylindrical chamber, which impeller creates a vacuum when engaged by the switch, to draw all debris created at the blade, into the cylindrical chamber where the debris is collected and encapsulated within a filter column. This filter column is fittable within the cylindrical chamber, and removable therefrom to be emptied or disposed of, as desired.

The impeller fits into the upper end of the cylindrical chamber, and rests upon the filter column. The filter column is sealably attached to the impeller by means of a gasket. A removable cover is attachable to the chamber, and covers the impeller. This cover is attachable by means of at least two clasps.

It is important to note that the filter column is disposed within the cylindrical chamber, which chamber is attachable to the cover and the intake column forming a cylindrical unit. Thus, the device is easily portable and usable via a distal end to cut weeds and vacuum debris.

The device has a rechargeable battery disposed within the removable cover. This battery is recharged by means of a charging base which releasably connects with a charging input disposed upon the cover by means of a jack perpendicularly disposed upon the base. A pair of hooked arms perpendicularly project from the charging base, which arms engage with and support the device handle. When the handle is placed upon the hooked arms, the jack is oriented to engage with the input, and the device is charged thereat.

The frustroconical cup has a convex side and a concave side. The motor for engaging the blade is mounted on the concave side of this cup, and the blade is mounted on a pivot disposed centrally on the convex side. This frustroconical cup has a base diameter of a lesser length than the diameter of the intake column, thereby creating a gap between the cup and the intake column. This gap serves to increase the suction of the device, by creating a smaller area over which the vacuum is impelled, and debris is subsequently drawn through the gap into the filter column.

Thus has been broadly outlined the more important features of the present weed cutter with vacuum so that the detailed description thereof that follows may be better understood and in order that the present contribution to the art may be better appreciated.

Objects of the present weed cutter with vacuum, along with various novel features that characterize the invention are particularly pointed out in the claims forming a part of this disclosure. For better understanding of the weed cutter with vacuum, its operating advantages and specific objects attained by its uses, refer to the accompanying drawings and description.

BRIEF DESCRIPTION OF THE DRAWINGS

Figures

DETAILED DESCRIPTION OF THE DRAWINGS

Figure 1:
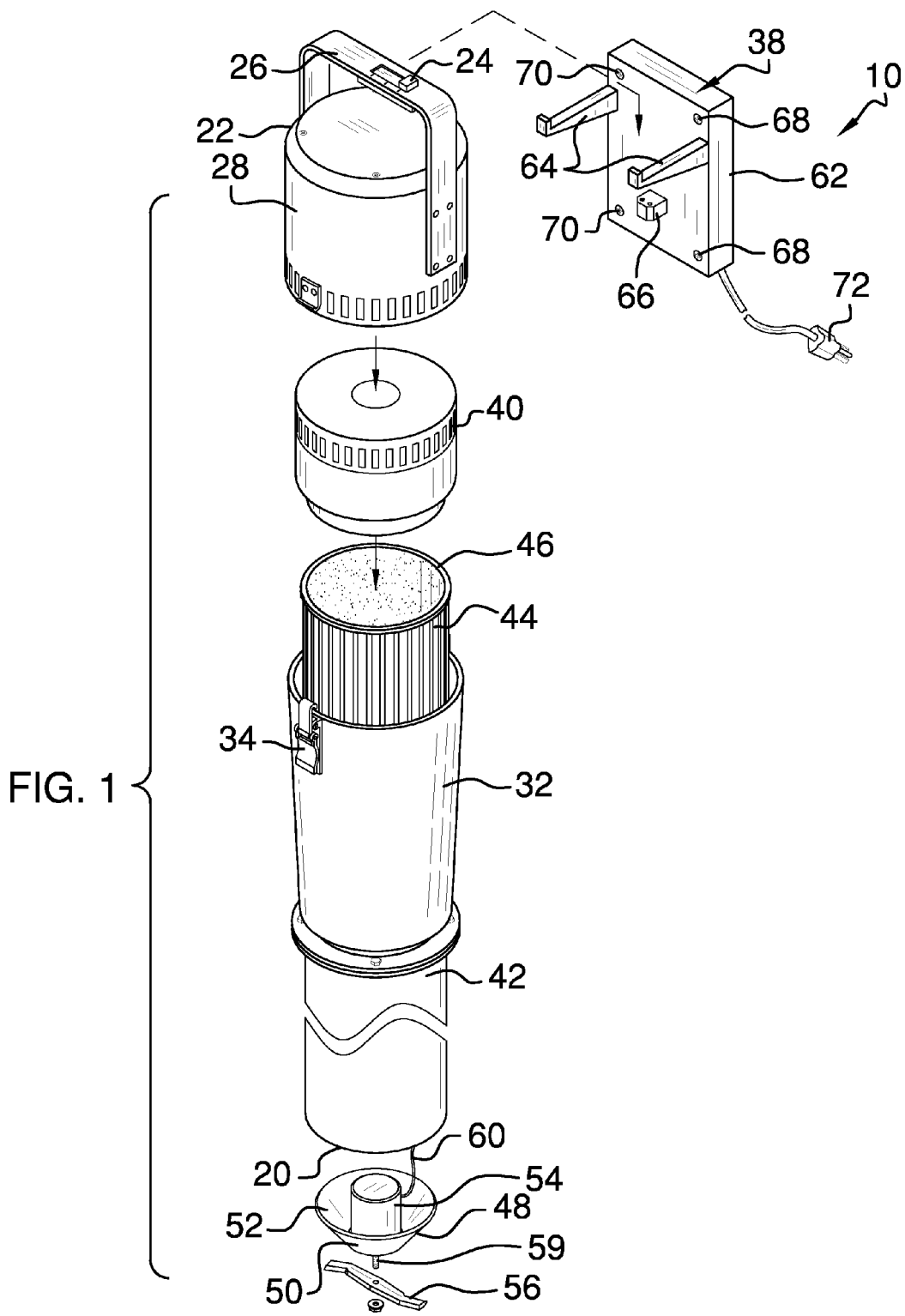
FIG. 1 is an exploded view.
Figure 2:
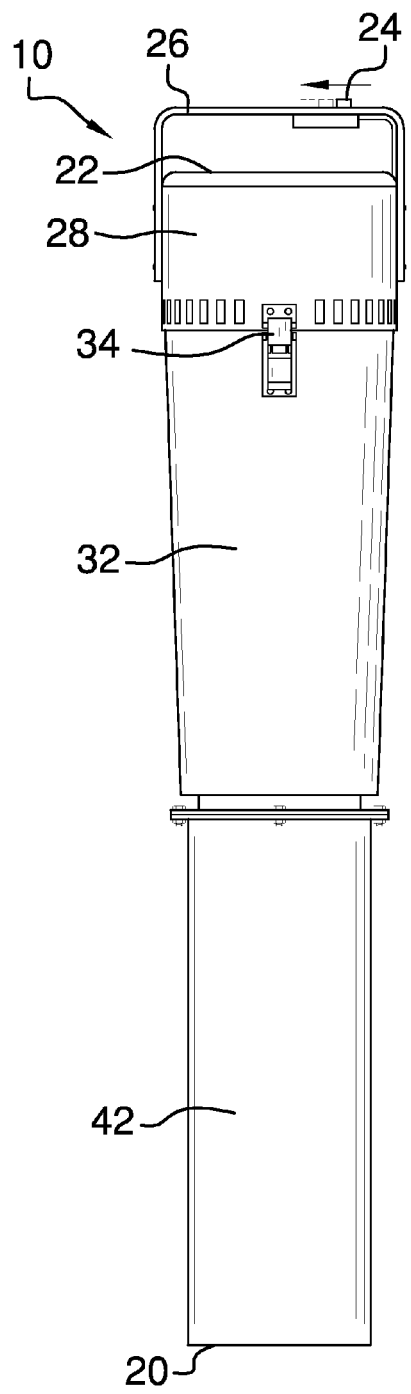
FIG. 2 is a front view.
Figure 3:
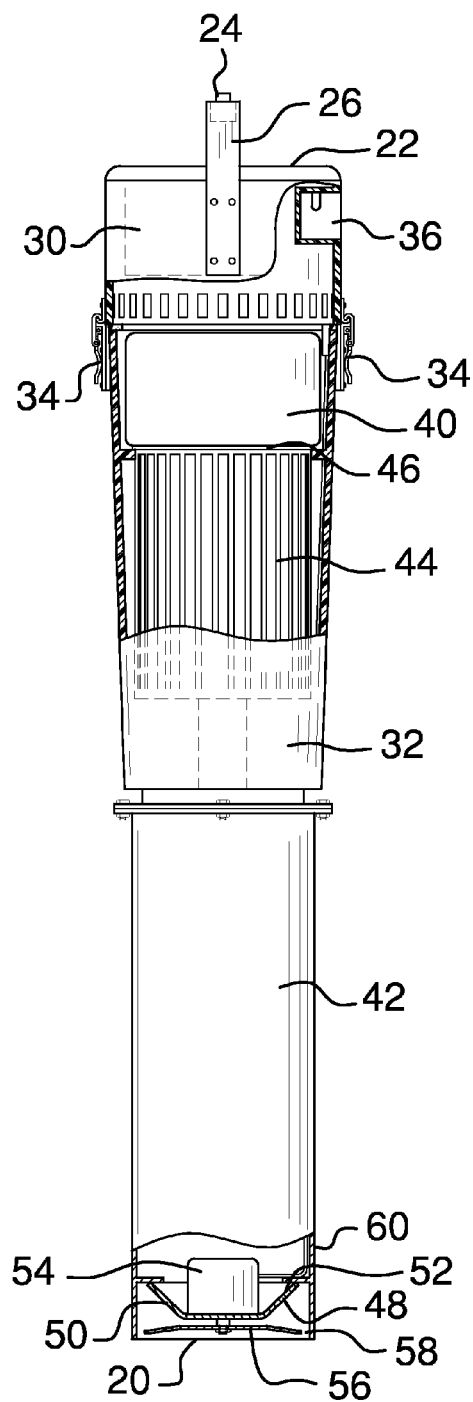
FIG. 3 is a side view with cutaway section.
Figure 4:
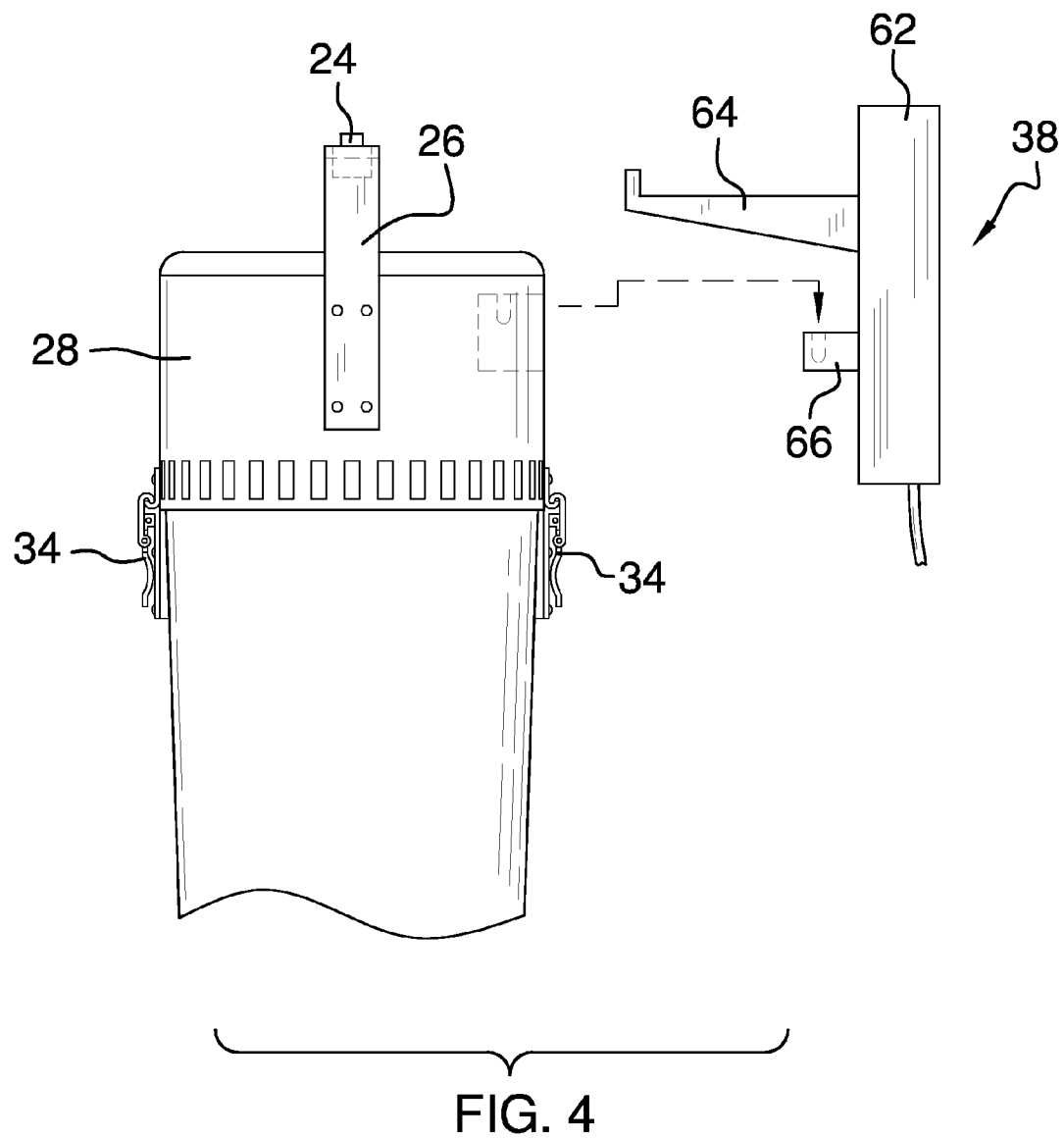
FIG. 4 is a detail view illustrating a charging base.
Figure 5:
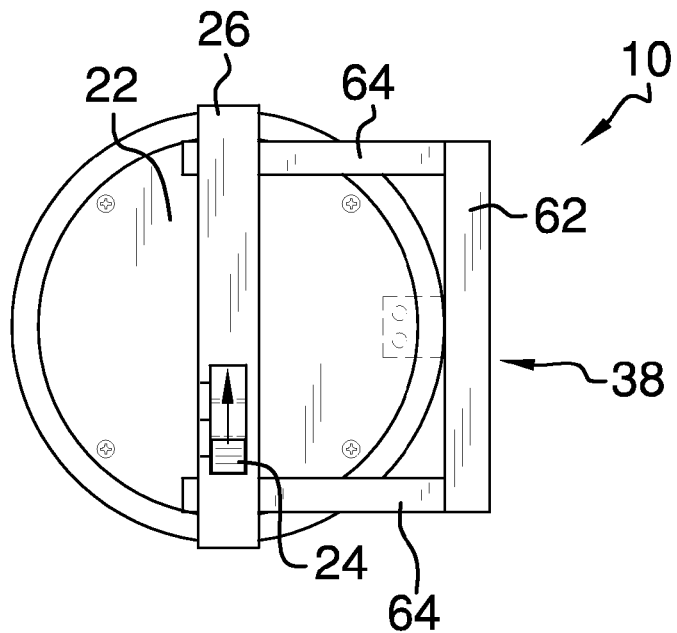
FIG. 5 is a top view.
Figure 6:
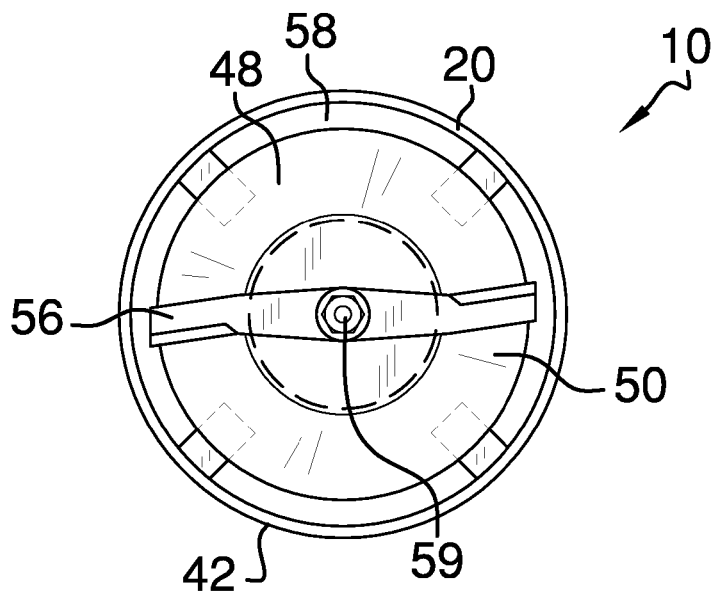
FIG. 6 is a bottom view.

With reference now to the drawings, and in particular FIGS. 1 through 6 thereof, example of the instant weed cutter with vacuum employing the principles and concepts of the present weed cutter with vacuum and generally designated by the reference number 10 will be described.

Referring to FIGS. 1 through 6 a preferred embodiment of the present weed cutter with vacuum 10 is illustrated.

The weed cutter with vacuum 10 includes a distal end 20 and a proximal end 22. A switch 24 is disposed upon the proximal end 22. In the preferred embodiment disclosed in this specification, this switch 24 is disposed upon a raised handle 26. The switch 24 moves between three positions as is described subsequently in this specification.

The raised handle 26 is disposed upon the proximal end 22. This handle 26 is disposed upon a cylindrical cover 28, and a rechargeable battery 30 is removably disposed within the cover 28. This cover 28 is removably attachable to a cylindrical chamber 32. The cover 28 is releasably attachable to the chamber 32 by means of at least two clasps 34. The cover 28 also includes a charging input 36, said input 36 recessed to releasably engage with a charging base 38 (see FIGS. 4 and 5), as will be further detailed below.

A vacuum impeller 40 is disposed within the cylindrical chamber 32 and protrudes upward therefrom. The vacuum impeller 40 is coverable by the cover 28 when the cover 28 is attached to the cylindrical chamber 32. A cylindrical intake column 42 is fastened to the chamber 32 endwise opposite the impeller 40.

A filter column 44 is fittable within the chamber 32 and engages with the impeller 40 when fitted within the chamber 32. This filter column 44 sealably engages around the impeller 40 by means of a gasket 46. Debris thusly drawn into the chamber 32 by means of the impeller 40 is captured within the filter column 44 for easy disposal. The impeller 40 is removable from the chamber 32 when the cover 28 is removed thus enabling the filter column 44 to be changed as needed.

A frustroconical cup 48 is disposed within the intake column 42, proximal the distal end 20. The frustroconical cup 48 has a convex side 50 and a concave side 52. A motor 54 is disposed upon the frustroconical cup 48 concave side 52. This motor 54 operationally communicates with a cutting blade 56, which blade 56 is disposed proximal the distal end 20 upon the frustroconical cup 48 convex side 50. This blade 56 is mounted on a central pivot 59 attached to the frustroconical cup 48 to rotate in a transverse plane relative the intake column 42.

It should be noted that the frustroconical cup 48 has a base diameter less than the diameter of the intake column 42 at the distal end 20. Thusly, a gap 58 is disposed between the base of the frustroconical cup 48 and the intake column 42, through which gap 58 debris is drawn by means of the vacuum created by the impeller 40. Thusly, the debris is drawn into the chamber 32 and captured by the filter column 44. It is envisioned that this gap 58 also lessens the draw area over which the vacuum is impelled, thereby increasing the device 10 suction relative a wider opening.

A plurality of wiring 60 is disposed between the battery 30, the motor 54, the impeller 40 and the switch 24. The switch 24 is thusly in operational communication in circuit with the motor 54, the impeller 40, and the battery 30. The switch 24 is moveable between three positions; a first position disconnects the circuit, a second position operationally engages the impeller 40, and a third position operationally engages the motor 54 and the impeller 40, whereby the blade 56 spins to cut weeds, grasses, and other vegetation, and the vacuum created by the impeller 40 draws debris into the cylindrical chamber 32 where the debris is captured by the filter column 44. It should be noted that this switch 24 is envisioned in the preferred embodiment here disclosed upon the raised handle 26 to be proximal the hands of a user, but that, as manufacture may require, the device 10 should not be considered limited by one such switch 24, but that multiple switches may be envisioned, as dictated at manufacture, if preferred.

The present device 10 also has a charging base 38. This charging base 38 includes a parallelepiped body 62. A pair of hooked arms 64 are disposed perpendicularly with respect to the body 62. The hooked arms 64 are configured to releasably engage and support the cover 28 by supporting the handle 26. The hooked arms 64 are envisioned to be capable of supporting the entire device 10 when the device is assembled as a single unit, and the cover 28, thusly attached to the rest of the device 10, is attached to the charging base 38 by means of the handle 26.

A charging jack 66 is disposed upon the body 62, which jack 66 releasably engages with the charging input 36 disposed on the cover 28. The hooked arms 64 are configured to support the device 10 such that the jack 66 aligns and interconnects with the input 36 when the device is placed on the hooked arms 64. A plurality of holes 68 is disposed within the body 62, which holes 68 are configured to releasably receive a plurality of fasteners 70 therethrough to secure the base 38 to a wall. A plug 72 is connected to the base 38 and operationally connected in circuit with the charging jack 66. Thusly, the charging base 38 is mountable to a wall and interconnectable to a wall outlet (not shown), whereby the battery 30 is rechargeable when the weed cutter with vacuum 10 is supported by the hooked arms 64 and the jack 66 engages with the input 36.

Thusly, the weed cutter with vacuum 10 may be charged when not in use by simply connecting the device 10 with the charging base 38. When needed, the device 10 may be simply retrieved therefrom and put into use at the flick of the switch 24.

What is claimed is:
1. A weed cutter with vacuum comprising:
a distal end;
a proximal end;
a switch disposed on the proximal end;
a raised handle disposed on the proximal end, said handle disposed upon a removable cylindrical cover;
a rechargeable battery removably disposed within the cover;
a cylindrical chamber removably attachable to the cover;
a vacuum impeller disposed within the cylindrical chamber coverable by the cover;
a cylindrical intake column fastened to the chamber;
a filter column fittable within the chamber to surround the impeller;
a frustroconical cup disposed within the intake column proximal the distal end, the frustroconical cup having a convex side and a concave side;
a motor disposed upon the frustroconical cup concave side;
a cutting blade operationally engaged by the motor, the blade disposed proximal the distal end upon the frustroconical cup convex side;

a plurality of wiring disposed between the battery, the motor, the impeller and the switch, which switch is in operational communication in circuit with the motor, the impeller, and the battery;

wherein the switch is moveable between three positions, a first position disconnecting the circuit, a second position operationally engaging the impeller, and a third position operationally engaging the motor and the impeller, whereby the blade spins to cut weeds, grasses, and other vegetation, and the vacuum created by the impeller draws debris into the cylindrical chamber to be captured by the filter column.

2. The weed cutter with vacuum of claim 1 wherein the cover further comprises a charging input, said input releasably engaging with a charging base.

3. The weed cutter with vacuum of claim 2 wherein the charging base comprises:

a parallelepiped body;

a pair of hooked arms disposed perpendicularly with respect to the body, the hooked arms configured to releasably engage and support the cover;

a charging jack disposed upon the body, which jack releasably engages with the charging input;

a plurality of holes disposed within the body, which holes are configured to releasably receive a plurality of fasteners therethrough to secure the base to a wall;

a plug connected to the base and operationally connected in circuit with the charging jack;

wherein the charging base is mountable to a wall and interconnectable to a wall outlet, whereby the battery is rechargeable when the weed cutter with vacuum is supported by the hooked arms and the jack engages with the input.

4. The weed cutter with vacuum of claim 3 wherein the frustroconical cup has a base diameter less than the diameter of the intake column at the distal end.

5. The weed cutter with vacuum of claim 4 wherein the cover is releasably attachable to the chamber by means of at least two clasps.

6. The weed cutter with vacuum of claim 5 wherein the filter column sealably engages around the impeller by means of a gasket.

\* \* \* \* \*